United States Patent [19]

Ferreri et al.

[11] Patent Number: 5,332,798
[45] Date of Patent: Jul. 26, 1994

[54] FLUORINATED POLYURETHANES AND POLYURETHANE-UREAS, AND METHODS FOR PREPARING THEM

[75] Inventors: Enrico Ferreri, Pescara; Francesco Giavarini, Bergamo; Claudio Tonelli; Tania Trombetta, both of Milan, all of Italy; Ronald E. Zielinski, Fort Wayne, Ind.

[73] Assignee: Ausimont S.p.A., Milan, Italy

[21] Appl. No.: 994,667

[22] Filed: Dec. 22, 1992

[30] Foreign Application Priority Data

Dec. 23, 1991 [IT] Italy .................... MI91A003467

[51] Int. Cl.$^5$ .................... C08G 18/10
[52] U.S. Cl. .................... 528/61; 528/66; 528/70
[58] Field of Search .................... 528/61, 66, 70

[56] References Cited

U.S. PATENT DOCUMENTS

| | | | |
|---|---|---|---|
| 3,665,041 | 5/1972 | Sianesi et al. | 252/580 |
| 3,810,874 | 5/1974 | Mitsch et al. | 528/70 |
| 3,847,978 | 1/1974 | Sianesi et al. | 562/577 |
| 5,032,666 | 7/1991 | Hu et al. | 528/70 |
| 5,189,135 | 2/1993 | Cozzi et al. | 528/70 |

FOREIGN PATENT DOCUMENTS

| | | |
|---|---|---|
| 0148482 | 7/1985 | European Pat. Off. |
| 0151877 | 8/1985 | European Pat. Off. |
| 0359272 | 3/1990 | European Pat. Off. |
| 1309401 | 3/1973 | United Kingdom |
| 1309402 | 3/1973 | United Kingdom |

OTHER PUBLICATIONS

P. G. Edelman, "Polymer Preprints", pp. 314–315 (1990, "Perfluoropolyether Soft Segment Containing Polyurethanes").

*Primary Examiner*—John Kight, III
*Assistant Examiner*—Rachel Johnson
*Attorney, Agent, or Firm*—Elizabeth M. Barnhard

[57] ABSTRACT

Fluorinated polyurethanes and polyurethane-ureas, of heat-processable, elastomeric type, constituted by rubber-like blocks and hard blocks, comprising segments derived from:

(a) a macroglycol or polybutadiene-diol;
(b) a perfluoropolyether-diol of formula $$HO(CH_2CH_2O)_n-CH_2-Q-CH_2-(OCH_2CH_2)_nOH$$

wherein Q is a perfluoropolyether chain and "n" is comprised within the range of from 1 to 5;
(c) an aromatic, aliphatic, or cycloaliphatic diisocyanate; and
(d) an aliphatic, cycloaliphatic or aromatic diol or diamine, containing from 2 to 14 carbon atoms.

They contain from 4 to 30% by weight of fluorine, from 10 to 60% by weight of hard components, with the molar ratio of rubber-like components (a): (b) comprised within the range of from 2 to 20. At least 80% of rubber-like segments deriving from (b) component are connected, at least at one of their sides, through a segment deriving from (c) component, with a rubber-like segment deriving from (a) component.

14 Claims, No Drawings

FLUORINATED POLYURETHANES AND POLYURETHANE-UREAS, AND METHODS FOR PREPARING THEM

The present invention relates to novel fluorinated polyurethanes and polyurethane-ureas of heat-processable, elastomeric type, and to processes for preparing them.

Heat-processable elastomeric polyurethanes are known, which are widely used as structural materials in mechanical, textile, automotive and biomedical sectors.

They are generally obtained by polycondensation of macroglycols constituted by polyether-diols or polyesterdiols with aliphatic, cycloaliphatic or aromatic diisocyanates and aliphatic or cycloaliphatic diols containing from 2 to 14 carbon atoms.

The resulting polyurethanic structure is the typical structure of block copolymers, in which a crystalline phase (hard blocks deriving from the diisocyanate and $C_2$-$C_{14}$-diol) is dispersed inside a rubber-like phase (blocks deriving from the macroglycol). As the macroglycol, poli-(epsilon-caprolactone)-diol is often used.

These materials yield a frequently satisfactory combination of mechanical and elastomeric properties within a rather wide temperature range (of from $-40°$ C. up to $+100°$ C.) and are used, for exemplifying purposes, in the sealing systems in heavy-duty automative industry.

In these elastomers, when the hard phase content is high, said products show high values of tensile strength and elastic modulus, whilst the chemical resistance of the elastomers in particular their resistance to hydrolysis, and their heat resistance, although being generally satisfactory, sometimes are not high enough to secure a reliable performance under severe operating conditions.

The elastomers with a low content of hard phase display, on the contrary, insufficient mechanical properties and when are submitted to mechanical stresses, they can show creep phenomena, which render them useless.

In both above cited elastomer types, the surface properties and the resistance to chemicals is usually not very high, so that, when the type of application causes these materials to come into contact with hydraulic fluids or lubricants, as it occurs, e.g., in gaskets, sealing systems elbows, a chemical degradation of polymer takes place, with a consequent decay in mechanical properties, which may lead to the break of the polyurethane articles.

In multi-component sealing systems, in which the article is exposed to oscillatins, very severe surface friction phenomena are experienced, which may lead, within a short time, to wear or to the breakage of the elastomeric material.

Therefore, the need is much felt, of having available polyurethane materials which, while retaining, or possibly improving, the mechanical and processability properties which characterize macroglycol-based polyurethanes, are furthermore endowed with much higher values of resistance to chemicals and surface properties.

Italian patent 903,446 discloses crosslinked fluorinated polyurethanes obtained by means of polycondensation of polyisocyanates with particular hydroxy-capped perfluoropolyethers with formula

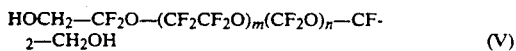

$$HOCH_2-CF_2O-(CF_2CF_2O)_m(CF_2O)_n-CF_2-CH_2OH \qquad (V)$$

These polyurethanes with a very high fluorine content show a good resistance to chemicals, but their mechanical properties are very poor: in particular, their tensile strength usually is lower than 1 MPa.

In European patent application 359,272, fluorinated polyurethanes are disclosed, which contain perfluoropolyether segments of rubber-like character, which are endowed with slightly improved properties as compared to the polymers of the prior patent. In particular, polymers with tensile strength values higher than 3 MPa are illustrated. In Example 21, the polyurethane is prepared by partially replacing the perfluoropolyether rubber-like phase with polytetramethyleneglycol.

A solvent process is used in which perfluoropolyetherdiol and polytetramethyleneglycol are simultaneously reacted with diisocyanate. The chain extension is subsequently carried out with butanediol. The product is then isolated by precipitation in a non-solvent, and purified by washing. The resulting polyurethane shows a tensile strength of 7.8 MPa.

A purpose of the present invention is of providing novel fluorinated polyurethanes and polyurethane-ureas which combine mechanical properties at least equal to, or even better than, such properties of hydrogenated polyurethanes discussed hereinabove, with improved chemical and surface properties, in particular, as regards the chemical stability towards aggressive agents such as, e.g., hydrocarbon fluids and chlorinated solvents, oil-repellancy, water-repellancy, friction and wear.

Another purpose is of providing processes for preparing the above said polyurethanes and polyurethane-ureas.

The first one of these purposes is achieved by novel heat-processable, elastomeric fluorinated polyurethanes, which are constituted by rubber-like blocks and hard blocks, comprising segments derived from:

(a) a diol of polyether or polyester type, or polybutadienediol, having an average molecular weight comprised within the range of from 500 to 4,000;

(b) a perfluoropolyether- or fluoropolyether-diol having an average molecular weight comprised within the range of from 400 to 10,000, of formula:

$$HO(CH_2CH_2O)_n-CH_2-Q-CH_2(OCH_2CH_2)_nOH \qquad (VI)$$

wherein:
n is comprised within the range of from 1 to 5, and
Q is a perfluoropolyether or fluoropolyether chain selected from the group consisting of

$$(1) \quad -CF_2-O-(CF_2CF_2O)_m(CF_2O)_p-CF_2- \qquad (I)$$

wherein $(CF_2CF_2O)$ and $(CF_2O)$ units are randomly distributed along the chain, and the ratio of m/p is comprised within the range of from 0.2 to 2;

(2)
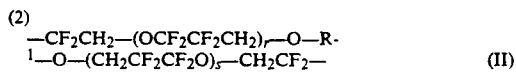
$$-CF_2CH_2-(OCF_2CF_2CH_2)_r-O-R^1-O-(CH_2CF_2CF_2O)_s-CH_2CF_2- \qquad (II)$$

wherein $R^1$ is a fluoroalkylene radical of from 1 to 10 carbon atoms, and the ratio of r/s is comprised within the range of from 0.8 to 1.2;

(3)
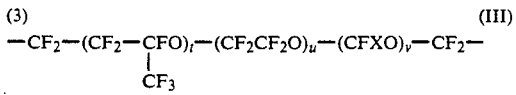

in which the units

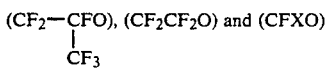

are randomly distributed along the chain;
X=F or $CF_3$;
t/u=0.6-2.0;
u/v is higher than 10;

(4) (IV)
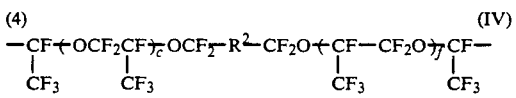

in which $R^2$ is a perfluoroalkylene radical of from 1 to 10 carbon atoms, and c/f=0.8−1.2, (c) an aromatic, aliphatic or cycloaliphatic diisocyanate having a molecular weight not higher than 500;

(d) an aliphatic, cycloaliphatic or aromatic diol of from 2 to 14 carbon atoms.

Said fluorinated polyurethanes are furthermore characterized in that:
(i) the hard components (c) and (d) represent, together, from 10 to 60% of total components, by weight;
(ii) the molar ratio of the rubber-like component (a) to the rubber-like component (b) is comprised within the range of from 2 to 20;
(iii) the amount of rubber-like component (b) is such that the polymer contains from 4 to 30% by weight of fluorine;
(iv) at least 80% of perfluoropolyether or fluoropolyether segments deriving from (b) component are connected, at least at one of their sides, through a segment deriving from a diisocyanate component (c), with a rubber-like segment deriving from an (a) component.

A further object of the present invention are novel fluorinated polyurethane-ureas, which are different from the just disclosed fluorinated polyurethanes, in that the (d) component is constituted by an aliphatic, cycloaliphatic or aromatic diamine of from 2 to 14 carbon atoms.

Unless the contrary is expressly stated, the term "polyurethane" as used herein, is understood to encompass also polyurethane-ureas, and the term "perfluoropolyethers", as used herein, is understood to encompass also fluoropolyethers.

The above said polyurethanes are endowed with an extremely good combination of physical-mechanical, chemical and surface properties, which is better defined in the following.

In fact, the present Applicant surprisingly found that a limited amount of fluorine, introduced through perfluoropolyether segments, not only does not jeopardize the mechanical properties of polyurethane, as one could expect on the basis of the state of the art, but, on the contrary, improves them, sometimes to a considerable extent.

The present Applicant surprisingly found also that the use of bridging bonds

between the perfluoropolyether chain and the hydroxy group considerably improves the chemical stability of the resulting polymer as compared to such moieties as $-CH_2-$, as illustrated in formula (V).

Finally, the present Applicant surprisingly found that only a very homogeneous distribution of both types of rubber-like segments [i.e., the one deriving from (a) component and the one derived from perfluoropolyether] in the polymeric chains can supply the extremely good combination of properties accomplished by means of the present invention. More precisely, the Applicant found that it is necessary that at least 80% of perfluoropolyether segments are connected, at at least one of their sides, through a bridging segment deriving from a diisocyanate component, with a rubber-like segment deriving from a component of (a) type which, for the sake of brevity, is referred to herein as a "macroglycol".

According to the present invention, it was found that such a homogeneity can only be obtained by resorting to two particular processes, which also are objects of the present invention.

In fact, by using several processes to cause the four components to react, polymeric chains were prevailingly obtained in which both types of rubber-like components tend to polycondense in separate regions of the chains, consequently originating non-homogeneous structures.

In other terms, if M represents the segment deriving from the macroglycol, Q represents the segment deriving from perfluoropolyether-diol and D represents the segment deriving from diisocyanate, chains with long sequences of

and

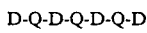

are obtained.

On the contrary, by using the two processes according to the present invention, which are disclosed in the following, at least 80% of Q segments are contained in sequences of

type, thus securing a considerable homogeneity of the polymeric structure.

The first process which constitutes an object of the instant invention, comprises the following steps:
(a) in the first step, the diisocyanate is reacted with the macroglycol or polybutadiene-diol, at temperatures comprised within the range of from 70° C. to 110° C., with a molar ratio of diisocyanate to macroglycol or polybutadiene-diol comprised within the range of from 2.0 to 2.5;
(b) in the second step, the end product from the first reaction step is reacted, within the same temperature range, with perfluoropolyether- or fluoropolyether-diol, using a molar ratio of macroglycol or polybutadiene-diol charged to the first step, to perfluoropolyether- or fluoropolyether-diol comprised within the range of from 2 to 20;

(c) in the third step, the prepolymer obtained in the second step is reacted with the C$_2$–C$_{14}$ diol or diamine, possibly adding additional diisocyanate, with the amount of diol or diamine being such that at least 95% of isocyanate groups charged to the (a) step and, possibly, to the (c) step, have reacted; in this step, the reaction is carried out at an initial temperature of from 20° C. to 60° C., which is increased (also as a consequence of reaction exothermicity up to values comprised within the range of from 60° C. to 100° C. at reaction end.

In the first step, the molar ratio of diisocyanate to macroglycol or polybutadiene-diol is preferably comprised within the range of from 2.0 to 2.2, and temperature is comprised within the range of from 80° C. to 90° C.

In the second step, the temperature is preferably comprised within the range of from 80° C. to 90° C.

In the third step, when diols are used, an initial temperature value comprised within the range of from 45° C. to 60° C., which makes it possible reaction exothermicity be controlled, is preferably used; therefore, the initial temperature will be the lower, the higher the number of —NCO groups which still have to react.

When diamines are used, the reaction is started with a temperature which is as low as possible (anyway, not lower than 20° C.), compatibly with the viscosity of the reaction mixture.

The amount of diisocyanate possibly charged to the third step is regulated as a function of to the percent content of hard segments, by weight, desired in the end polymer.

An important advantage of this process is that it is not necessary to use solvents, in any steps, thus avoiding the steps of reactants dissolution and solvent removal and recovery, which steps were necessary with the processes known from the prior art.

The second process which constitutes an object of the present invention comprises the following steps:

(1) the perfluoropolyether- or fluoropolyether-diol is reacted with the diisocyanate, in the presence of a solvent constituted by a chlorofluoroalkane or a hydrochlorofluoroalkane, at a temperature comprised within the range of from 50° C. to 100° C., using a molar ratio of diisocyanate/perfluoropolyether- or fluoropolyether-diol comprised within the range of from 2 to 2.5;

(2) the reaction mixture from the first step is reacted, within the same temperature range, with the macroglycol or polybutadiene-diol, with the molar ratio of macroglycol or polybutadiene-diol to perfluoropolyether- or fluoropolyether-diol being comprised within the range of from 2 to 2.5;

(3) by operating at temperatures comprised within the range of from 50° C. to 100° C., a further amount of diisocyanate is added. During this step, all solvent is gradually distilled off; then a further amount of macroglycol or polybutadiene-diol is added;

(4) by operating at temperatures comprised within the range of from 20° C. to 60° C., the C$_2$–C$_{14}$ diol or diamine is added, with such reactants being metered in such an amount that at least 95% of isocyanate groups charged to steps (1) and (3) have reacted.

A particularly suitable solvent for use in the second process is 1,2-difluoro-1,1,2,2-tetrachloroalkane.

The perfluoropolyether- and fluoropolyether-diols $$HO(CH_2CH_2O)_n\text{—}CH_2\text{—}Q\text{—}CH_2(OCH_2CH_2)_nOH \quad (VI)$$

used as the second rubber-like component, preferably have an average molecular weight comprised within the range of from 1000 to 5000 (throughout the disclosure of the present invention, reference to numeral average molecular weight is made). Such diols are prepared by starting from known diols of formula $$HO\text{—}CH_2\text{—}Q\text{—}CH_2\text{—}OH \quad (VII)$$

by ethoxylation.

For that purpose, the diols of formula (VII) can be treated, at room temperature, with a sodium alkoxide used in such an amount, as to form approximately 5–10% of alcoholate. The reaction product is subsequently treated with the desired amount of ethylene oxide, at a temperature comprised within the range of from 50° C. to 100° C., with ethylene oxide being added all at a time, or as a plurality of successive portions.

The value of "n" in perfluoropolyether- and fluoropolyether-diols obtained in that way is preferably comprised within the range of from 1 to 2.

The preparation of perfluoropolyether-diols $$HO\text{—}CH_2\text{—}Q\text{—}CH_2OH \quad (VII)$$

corresponding to perfluoropolyether chain (I) is disclosed in Italian patent 903,446.

The diols corresponding to chain (II) are obtained by reducing diacyl fluorides, as disclosed in European patent application 148,482.

The diols corresponding to chain (III) are obtained by means of the methods disclosed in U.S. Pat. Nos. 3,847,978 and 3,810,874, by starting from fluorides of diacids as disclosed in U.S. Pat. No. 3,665,041.

The diols corresponding to chain (IV) are prepared by the process as disclosed in European patent 151,877.

The macroglycols used as the first rubber-like component preferably have an average molecular weight comprised within the range of from 1000 to 4000, and the polybutadiene-diol has a molecular weight comprised within the range of from 2000 to 3000.

Examples of suitable macroglycols for use in the instant invention are poly(ethylene)glycol, poly(propylene)glycol, poly(tetramethylene)glycol, poly(1,4-butanediol adipate), poly(ethanediol-1,4-butanediol adipate), poly(1,6-hexanediol-neopentyl glycol adipate) and poly(epsilon-caprolactone).

The molar ratio of macroglycol or polybutadiene-diol to perfluoropolyether-diol is commonly comprised within the range of from 2 to 10.

Among the suitable diisocyanates for use in the present invention, 4,4'-methylene-diphenylene-diisocyanate, 2,4-toluene-diisocyanate, 2,6-toluene-diisocyanate, xylylene-diisocyanate, naphthalene-diisocyanate, para-phenylene-diisocyanate, hexamethylene-diisocyanate, isophorone-diisocyanate, 4,4'-dicyclohexyl-methane-diisocyanate and cyclohexyl-1,4-diisocyanate, can be mentioned.

Among preferred diisocyanates, the first three compounds from those listed hereinabove can be cited, because they endow the end polymer with better mechanical characteristics.

Among the $C_4$–$C_{12}$ diols suitable for use in the instant invention, there can be mentioned herein ethyleneglycol, 1,4-butanediol, 1,6-hexanediol, N,N-diethanolaniline and N,N-diisopropanolaniline.

Among the suitable diamines for use in the present invention, ethylenediamine, hexamethylenediamine and 3,3'-dichloro-4,4'-diamino-diphenylmethane can be mentioned.

The diol or diamine usually represent from 3 to 15% of total hard components, by weight.

The fluorinated polyurethanes according to the present invention are thermoplastic, elastomeric polymers commonly having an average molecular weight comprised within the range of from about 30,000 to about 70,000 and a melting point comprised within the range of from about 120° C. to about 240° C.

As compared to macroglycol-containing hydrogenated polyurethanes mentioned hereinabove, the fluorinated polyurethanes according to the present invention display at least equal, and generally better, physical-mechanical properties, with a superiority—with the mutual ratio of the equivalents of the several reactants being the same—which oftentimes may be very marked, in particular as regards the tensile strength. Also the chemical and surface properties are considerably better, in particular as regards chemical resistance (resistance to hydrolysis, to hydrocarbon fluids, to chlorinated solvents, and so forth), oil-repellency, water-repellency, lower friction values and self-lubricating and wear resistance properties.

In view of the above said very good combination of properties, the fluorinated polyurethanes according to the present invention are particularly suitable for use in structures and articles exposed to very severe mechanical and chemical conditions, such as, e.g., sealing systems, fittings and elbows for example in mechanical and automotive sectors.

The following examples are reported for merely illustrative purposes, and should not be regarded as being limitative of the purview of the present invention.

The specimens used in the examples were prepared from the polymers by a casting process, by operating with a temperature cycle in the press, with a starting temperature 30°–40° C. higher than polymer melting point; the temperature was then decreased down to 130° C. and was kept at that value for some hours.

EXAMPLE 1

In this example, the second process was used. 20.0 g (5.7 mmol, corresponding to 8.8% by weight, relatively to the weight of the end polymer, and to 5.3% by weight of fluorine, still based on the weight of the end polymer) of perfluoropolyether-diol of formula $HO(CH_2CH_2O)_n$—$CH_2$—$CF_2$—$O(CF_2$—$CF_2O)$-$_m$—$(CF_2O)_p$—$CF_2$—$CH_2$—$(OCH_2CH_2)_n OH$, which is termed "Z-DOLTX" in the following, wherein n=1,5 and m/p=1, is charged, under a nitrogen stream, to a 4-necked flask of 500 ml of capacity equipped with mechanical stirring means, water-cooled condenser and thermometer.

The average molecular weight of above said perfluoropolyether-diol is 3,500.

25 ml is added of Delifrene 112$^{(R)}$ ($CFCl_2$—$CFCl_2$). The reaction mixture is stirred for a few minutes, until the perfluoropolyether-diol is completely dissolved.

Then, 2.9 g (11.6 mmol) is added of 4,4'-methylene-diphenylene-diisocyanate (MDI). The reaction mixture is heated up to solvent reflux temperature (100° C.), and is kept at that temperature for 2 hours.

For the purpose of determining the growth of the prepolymer chain, a second test, analogous to the first one, is carried out in which, at the end of said two-hours reaction time, the solvent is evaporated off, from the reaction mixture free MDI is extracted and the amount thereof is determined by gas-chromatographic analysis, with internal standard. Such an amount is of 0.7 g, which corresponds to approximately 25% of charged MDI. On the reaction mass, after extraction, the level of —NCO is determined by titration with an excess of butylamine and hydrochloric acid. Said level results to be of 1.5%, vs. a theoretical value of 2.1%, corresponding to the shorter prepolymeric MDI-ZDOLTX-MDI structure, with an average molecular weight of 4,000.

Further analysis, carried out by gel permeation chromatography, are in compliance with the following distribution in prepolymeric mass:
* 50 mol % of MDI-ZDOLTX-MDI
* 40 mol % of MDI-ZDOLTX-MDI-ZDOLTX-MDI
* 10 mol % of MDI-ZDOLTX-MDI-ZDOLTX-MDI-ZDOLTX-MDI.

These values confirm that, in the second-step reaction with the macroglycol, 90% of perfluoropolyether segments deriving from ZDOLTX, will be bound, through a hard MDI segment, with a rubber-like segment derived from the macroglycol.

Then, to the prepolymer resulting from the first test, a further 30 ml of Delifrene 112 and 23.0 g (11.5 mmol) of poly(epsilon-caprolactone)-diol with average m.w. 2,000 (PCL 2000) are added, and the reaction mixture is kept heated at reflux temperature, still under nitrogen, until the I.R. signal relevant to —NCO (at 2,270 $cm^{-1}$) disappears.

The residual amount of MDI: 80.7 g (323 mmol) is added, and the removal of solvent is started, gradually increasing vacuum and maintaining temperature at 100° C.

Still with stirring, 77.0 g (38.5 mmol) of PCL 2000 is added and the reaction mixture is kept at 100° C. for a further 30 minutes.

Unreacted —NCO is titrated in order to be able to determine the exact amount of 1,4-butanediol (BDO) to be added in order to complete the "chain extension".

When the titration is ended, the reaction mixture is adjusted at 50°–60° C. under vacuum; with compensated funnel, 24.4 (271 mmol) of BDO is added, and the reaction mixture is kept vigorously stirred for three minutes.

The resulting mixture is charged to a mould and the moulding is carried out on a press, at 220°–230° C. for 2 minutes; then the moulded specimen is cooled down to 130° C. within a 15-minutes time and is kept standing at that temperature for a 5-hours time.

The resulting polymer, tested for its mechanical and physical-chemical characteristics, gave the following results (which were compared to the analogous, totally hydrogenated product):

| Molar ratio perfluoropolyether-diol:PCL:BDO:MDI: | |
|---|---|
| *Fluorinated polymer: 0.1:0.9:5.0:6.0 | |
| *Comparative hydrogenated polymer: 0:1.0:5.0:6.0 | |
| | Fluorinated polymer | Comparative hydrogenated polymer |
| Hardness (Shore A)- (ASTM 2240) | 95 | 93 |

-continued

| Molar ratio perfluoropolyether-diol:PCL:BDO:MDI: *Fluorinated polymer: 0.1:0.9:5.0:6.0 *Comparative hydrogenated polymer: 0:1.0:5.0:6.0 | | |
|---|---|---|
| | Fluorinated polymer | Comparative hydrogenated polymer |
| Modulus 20% (MPa) | 56.5 | 34.5 |
| (ASTM D 412-D) | 31.0 (*) | 13.0 (*) |
| Modulus 100% (MPa) | 15.9 | 9.3 |
| (ASTM D 412-D) | 8.5 (*) | 3.8 (*) |
| Tensile strength (MPa) | 52.0 | 21.0 |
| (ASTM D 412-D) | 26.2 (*) | 6.0 (*) |
| Elongation at break (%) | 477 | 485 |
| (ASTM D 412-D) | 535 (*) | 415 (*) |
| Friction coefficient (ASTM D 1892) | | |
| * Static | 0.70 | 4.5 |
| * Dynamic | 0.70 | (**) |
| Contact angle: | | |
| * H₂O | 81 | 46 |
| * Hexadecane | 56 | 23 |

* Measurement carried out at 100° C.
** This value could not be determined, because the material sticks to the metal surface.

EXAMPLE 2

ZDOLTX with average molecular weight 3500, PCL with average molecular weight 1250, BDO and MDI are charged in the following molar ratios: 0.08:0.92:1.0:2.0 (corresponding to 11.7% by weight of ZDOLTX) and 7% of fluorine), and reacted in the same reactor and according to the same operating procedure as of Example 1. The resulting polymer is charged to a mould, and is moulded in a press at 230° C. for 3 minutes and then at 130° C. for 5 hours.

The resulting material is tested for its mechanical and physical-chemical characteristics, and is compared to the corresponding, fully hydrogenated product.

The results of such tests are summarized in the following table:

| | Polymer according to the invention | Comparative polymer (PCL 1250: BDO:MDI = 1:1:2 |
|---|---|---|
| % by weight of hard phase | 31 | 32 |
| Hardness (Shore A) | 75 | 72 |
| Modulus 20% (MPa) | 10.0 | 9.5 |
| Modulus 100% (MPa) | 3.6 | 3.1 |
| Tensile strength (MPa) | 40.3 | 9.1 |
| Elongation at break (%) | 505 | 927 |
| Friction coefficient | | |
| * Static | 0.65 | 5.0 |
| * Dinamic | 0.65 | (*) |
| Contact angle: | | |
| * H₂O | 84 | 44 |
| * Hexadecane | 59 | 21 |

* This value could not be determined, because the material sticks to the metal surface.

By comparing the data shown in the above table, one may see that the polymer according to the invention displays a tensile strength value which is 4.4 times as high as of the corresponding hydrogen-containing polymer.

EXAMPLE 3

ZDOLTX 3500/PCL 2000/BDO/MDI are reacted, in the mutual molar ratio of 0.25:0.75:5:6, in the same reaction vessel and according to the same reaction modalities, as of Example 1.

That composition corresponds to a content of ZDOLTX in the end material, of 18.2% and to a fluorine content of 11%

| | Polymer according to the invention | Comparative polymer 0:1.0:5:6 |
|---|---|---|
| % by weight of hard phase | 46 | See Example 1 |
| Hardness (Shore A) | 95 | |
| Modulus 20% (MPa) | 51.3 | |
| Modulus 100% (MPa) | 14.9 | |
| Tensile strength (MPa) | 46.7 | |
| Elongation at break (%) | 464 | |

Once again, the surprising increase in mechanical characteristics is confirmed, as compared to the equivalent hydrogen-containing polymer.

EXAMPLE 4

The present Example reports on comparative tests of resistance to hydrolysis, according to ASTM standard D 573.

Two specimens prepared from polymers with polycaprolactone-based rubber-like phase, containing, as the structural modifier, a certain percentage of ZDOLTX, and a third specimen prepared from a polymer not containing ZDOLTX, were submitted to an ageing test, carried out by soaking in distilled water (70 hours at 70° C.).

The percent change in mechanical properties is then evaluated. The obtained results are reported for the following products:

| A = ZDOLTX 3500/PCL 1250/BDO/MDI = 0.07:0.93:3:4 B = ZDOLTZ 3500/PCL 2000/BDO/MDI = 0.25:0.75:5:6 C = Polymer not falling within the scope of the invention, PCL 2000/BDO/MDI 1:6:7. | | | |
|---|---|---|---|
| | "A" Product | "B" Product | "C" Product |
| Change in hardness (points) | −1 | −1 | −2 |
| Tensile strength (change, %) | −4.9 | −3.7 | −19 |
| Elongation at break (change) | +3.5 | +2.0 | −14. |
| Volume change (%) | +1.4 | +1.0 | +1.7 |

From an analysis of the data reported in the table, it can be seen that the hydrogen-containing product undergoes a greater change in its mechanical properties, as a consequence of a faster hydrolysis of the material.

On the contrary, the polymers according to the present invention do not undergo any appreciable changes in their mechanical properties.

EXAMPLES 5-14

Polymers containing different levels of fluorine and different levels of hard phase were synthetized according to as disclosed in Example 1. These products, when compared—in a plurality of cases—to the corresponding hydrogen-containing polymers for their mechanical properties, gave the results reported in Table I.

EXAMPLE 15

In this example, fluorinated polyurethane is prepared according to the first process.

80 g (0.08 mol) of polytetramethyleneglycol (PTMEG) with molecular weight 1000 is charged under nitrogen to a reactor of 500 ml of capacity. 40 g of MDI (0.16 mol) is added. The reaction is allowed to proceed at 90° C. for 2 hours. Then, 50 g (0.02 mol) of ZDOLTX with average molecular weight 2500 is added. The reaction is allowed to proceed at 90° C. for 2 hours. A further 10 g of MDI (0.04 mol) is added. The reaction mass is gradually evacuated, in order to completely remove the gases from the system. The reaction mass is cooled down to 60° C., and 8.55 g of butanediol (0.095 mol) (95% of theoretical amount) is added, then the reaction is allowed to proceed under vacuum, and with strong stirring for 3 minutes.

Owing to the reaction exothermicity, the temperature increases up to 66° C. The reaction mass is cast into a mould and the moulding is carried out in a press at 220° C. for 2 minutes, then the temperature is decreased down to 130° C. and is kept at that value for a further 7 hours.

The molar proportions of monomeric moieties in the polymer is as follows: ZDOLTX/PTMEG/MDI/BDO=0.2:0.8:2.0:1.0.

| The resulting polymeric sheet is tested for its physical-mechanical properties, with the following results: | |
|---|---|
| Hardness, Shore A | 79 |
| Modulus 20% | 8.7 MPa |
| Modulus 100% | 4.1 MPa |
| Tensile strength | 31.6 Mpa |
| Elongation at break | 400% |

EXAMPLES 16-19

The tests reported in following Table II were carried out according to the same procedure as disclosed in Example 15.

EXAMPLE 20 (COMPARATIVE EXAMPLE)

A fluorinated polyurethane was prepared by starting from components according to the present invention, but using a preparation process according to the prior art, and namely, according to the process disclosed in Example 21 of already cited European patent application 359,272.

The components were used in the following molar ratios: ZDOLTX 3500/PCL 2000/MDI/BDO=0.2:0.8:2:1.

The preparation was carried out according to the modalities of above said example. A polymeric material with a non-homogeneous appearance was obtained, which showed the following mechanical properties:

| Modulus 100% | 0.5 MPa |
|---|---|
| Tensile strength | 2.5 MPa |
| Elongation at break | 400% |

An analogous polymeric material (analogous in terms of mutual molar ratios of reactants) was prepared according to the procedures disclosed in above Example 15 of the present disclosure. After compression-moulding, a homogeneous plate was obtained, the mechanical properties of which are the following:

| Modulus 20% | 2.7 MPa |
|---|---|
| Modulus 100% | 2.5 MPa |
| Tensile strength | 38.1 MPa |
| Elongation at break | 530% |

EXAMPLE 21 (COMPARATIVE EXAMPLE)

A fluorinated polyurethane was prepared by starting from components according to the present invention, using another process according to the prior art, as disclosed by P. G. Edelman et al., Polymer Preprints 1990, pages 314-315.

Such a process starts from MDI, BDO, PTMEG and a perfluoropolyether-diol not according to the present invention, with formula

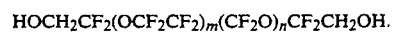

$HOCH_2CF_2(OCF_2CF_2)_m(CF_2O)_nCF_2CH_2OH$.

In the instant test, all components according to the present invention were used, and namely: ZDOLTX 3500/PTMEG 2000/MDI/BDO with a mutual molar ratio of 0.1:0.9:2.1, however by operating according to the preparation processes disclosed by the above Authors.

More precisely, 10 ml of toluene, 1.39 g of MDI (5.6 mmol) and 0.1% (by weight/weight, relatively to MDI) of catalyst (dibutyltin dilaurate, DBTDL) are charged to a reactor of 100 ml of capacity, equipped with mechanical stirring means, condenser and fitting for reactant feed.

To this solution, 9.68 g of ZDOLTX (2.7 mmol), diluted in 40 ml of toluene, is added. After the addition, the system—which has a non-homogeneous appearance—is allowed to react for 2 hours, with strong stirring, at room temperature.

40 ml of dimethylacetamide (DMA), 12.25 g of MDI (49 mmol), 0.1% (by weight/weight, based on isocyanate) of DBTDL catalyst are charged to another reactor, similar to the preceding one.

To this solution, 47.25 of PTMEG 2000 (25 mmol) diluted in 100 ml of DMA is added. After the addition, the system is allowed to react for 2 hours at room temperature, with strong stirring.

The reaction mixture containing the fluorinated macromer is then rapidly added to the second system.

The temperature is increased up to 80° C. and is allowed to react for 1.5 hours.

Now, 2.37 g of BDO (a chain extender) (26 mmol, 95% of theoretical value), diluted in 10 ml of DMA, is added; the reaction mass is kept for a further 4 hours at 80° C.

The resulting polymer is then precipitated from methanol, is washed with methanol and dried under vacuum.

The resulting granules are compression-moulded at 190° C.

The plate of polymeric material, tested for mechanical characteristics, gave the following results:

| Modulus 100% | 1.1 MPa |
|---|---|
| Tensile strength | 12.0 MPa |
| Elongation at break | 1000% |

The same polymeric material (i.e., as for composition) was synthetized according to such modalities as disclosed in Example 15.

After compression-moulding, a plate was obtained, the mechanical properties of which are as follows:

| | |
|---|---|
| Modulus 100% | 2.2 MPa |
| Tensile strength | 25.0 MPa |
| Elongation at break | 600% |

| | |
|---|---|
| Hardness, Shore A | 85 |
| Modulus 20% | 12.3 MPa |
| Modulus 100% | 7.5 MPa |
| Tensile strength | 28.2 MPa |
| Elongation at break | 280% |

EXAMPLE 22

TABLE I

| Test number | PCL:BDO:MDI (molar ratio) | ZDOLTX 3500 (molar ratio) | Total amount of hard components (% by weight) | Temperature at which tests were carried out (°C.) | Shore A | Modulus 20% (MPa) | Modulus 100% (MPa) | Tensile strength (MPa) | Elongation at break (%) | Melting temperature (°C.) |
|---|---|---|---|---|---|---|---|---|---|---|
| 5 | 1:1:2 (X) | 0 | 32 | 23 | 72 | 9,5 | 3,1 | 9,1 | 927 | 123 |
| 6 | 0,967:1:2 (X) | 0,033 | 31 | 23 | 74 | 10,3 | 3,5 | 29,5 | 591 | 122 |
| 7 | 1:2:3 (X) | 0 | 43 | 23 | 91 | 28,0 | 9,4 | 52,0 | 460 | |
| | | | | 100 | | 15,0 | 4,9 | 10,5 | 400 | |
| 8 | 0,967:2:3 (X) | 0,033 | 41 | 23 | 90 | 29,0 | 9,8 | 50,5 | 467 | |
| 9 | 1:3:4 (X) | 0 | 50 | 23 | 92 | 32,3 | 11,7 | 50,0 | 430 | 172 |
| 10 | 0,967:3:4 (X) | 0,033 | 49 | 23 | 93 | 37,8 | 14,0 | 53,0 | 393 | 207 |
| 11 | 0,93:3:4 (X) | 0.07 | 48 | 23 | 92 | 34,2 | 11,8 | 54,2 | 500 | |
| | | | | 100 | | 15,5 | 5,2 | 33,5 | 633 | |
| 12 | 0,967:4:5 (XX) | 0,033 | 44 | 23 | 75 | 22,6 | 7,5 | 25,0 | 512 | |
| 13 | 1:5:6 (XX) | 0 | 49 | 23 | 93 | 34,5 | 9,3 | 21,0 | 485 | |
| | | | | 100 | | 13,0 | 3,8 | 6,0 | 415 | |
| 14 | 0,967:5:6 (XX) | 0,033 | 48 | 23 | 94 | 47,0 | 13,8 | 51,0 | 451 | |
| | | | | 100 | | 26,8 | 7,3 | 30,2 | 700 | |

(X) PCL 1250
(XX) PCL 2000

TABLE II

| | Proportions, as mols | | | | Properties | | | | |
|---|---|---|---|---|---|---|---|---|---|
| Test number | ZDOLTX 2000 | Macroglycol | MDI | BDO | Shore A | Modulus 20% (MPa) | Modulus 100% (MPa) | Tensile strength (MPa) | Elongation at break (%) |
| 16 | 0,2 | PTMEG 1000 0,8 | 2,3 | 1,3 | 81 | 10,4 | 4,9 | 50,3 | 450 |
| 17 | 0,3 | PTMEG 2000 0,7 | 3,0 | 2,0 | 93 | 30 | 8,8 | 31,3 | 410 |
| 18 | 0,1 | PCL 1250 0,9 | 2,0 | 1,0 | 75 | 7 | 3,2 | 43,6 | 440 |
| 19 | 0,2 | PCL 1250 0,8 | 2,0 | 1,0 | 72 | 8,8 | 3,4 | 42,3 | 440 |

In this example, a fluorinated polyurethane-urea is prepared according to the first process.

80 g (0.08 mol) of polytetramethyleneglycol (PTMEG) with molecular weight 1,000 is charged under nitrogen to a reactor of 500 ml capacity. 40 g of MDI (0,16 mol) is added. The reaction is allowed to proceed at 90° C. for 2 hours. A further 10 g of MDI (0,04 mol) is added. The reaction mass is gradually evacuated, in order to completely remove the gas from the system. The reaction mass is cooled down to 55° C., and 11.04 g of hexamethylenediamine (0.095 mol) (95% of theoretical amount) is added; then the reaction is allowed to proceed under vacuum, and with strong stirring for 1.5 minutes.

Owing to the reaction exothermic character, the temperature increases up to 88° C. The reaction mass is cast into a mould and the molding is carried out in a press at 220° C. for 2 minutes; then, the temperature is decreased down to 130° C. and is kept at that value for further 7 hours.

The molar proportions of monomeric moieties in the polymer is as follows: ZDOL TX/PTMEG/MDI/HMDA=0.2:0.8:2.0:1.0.

The polymer sheet is tested for its physical-mechanical properties, with the following results:

We claim:
1. Heat-processable, elastomeric fluorinated polyurethanes constituted by rubber-like blocks and hard blocks, comprising segments derived from:
(a) a diol of polyether or polyester type, or polybutadienediol, having an average molecular weight comprised within the range of from 500 to 4,000;
(b) a perfluoropolyether- or fluoropolyether-diol having an average molecular weight comprised within the range of from 400 to 10,000, of formula:

$$HO(CH_2CH_2O)_n-CH_2-Q-CH_2(OCH_2CH_2)_nOH$$

wherein:
n is comprised within the range of from 1 to 5, and
Q is a perfluoropolyether or fluoropolyether chain selected from the group consisting of:

(1) $-CF_2-O-(CF_2CF_2O)_m(CF_2O)_p-CF_2-$ (I)

wherein $(CF_2CF_2O)$ and $(CF_2O)$ units are randomly distributed along the chain, and the ratio of m/p is comprised within the range of from 0.2 to 2;

(2)

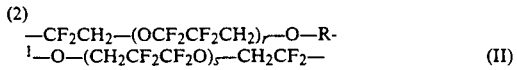
(II)

wherein $R^1$ is a fluoroalkylene radical of from 1 to 10 carbon atoms, and the ratio of r/s is comprised within the range of from 0.8 to 1.2;

(3)

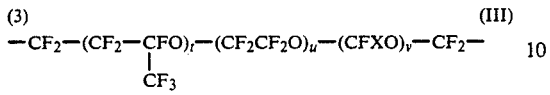
(III)

in which the units

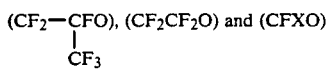

are randomly distributed along the chain;
$X = F$ or $CF_3$;
$t/u = 0.6-2.0$;
$u/v$ is higher than 10;

(4)

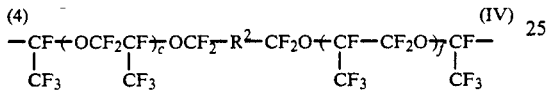
(IV)

in which $R^2$ is a perfluoroalkylene radical of from 1 to 10 carbon atoms, and $c/f = 0.8-1.2$, (c) an aromatic, aliphatic or cycloaliphatic diisocyanate having a molecular weight not higher than 500;

(d) an aliphatic, cycloaliphatic or aromatic diol of from 2 to 14 carbon atoms;

with said fluorinated polyurethanes being furthermore characterized in that:
(i) the hard components (c) and (d) represent, together, from 10 to 60% of total components, by weight;
(ii) the molar ratio of the rubber-like component (b) to the rubber-like component (b) is comprised within the range of from 2 to 20;
(iii) the amount of rubber-like component (b) is such that the polymer contains from 4 to 30% by weight of fluorine;
(iv) at least 80% of perfluoropolyether or fluoropolyether segments deriving from (b) component are connected, at at least one of their sides, through a segment deriving from a diisocyanate component (c), with a rubber-like segment deriving from an (a) component.

2. Fluorinated polyurethanes according to claim 1, characterized in that the value of "n" in the formula of (b) component is of 1 or 2.

3. Elastomeric, heat-processable polyurethane-ureas constituted by rubber-like blocks and hard blocks, comprising sequences derived from:
(a) the same (a) component as of claim 1;
(b) the same (b) component as of claim 1;
(c) the same (c) component as of claim 1;
(d) an aliphatic, cycloaliphatic or aromatic diamine containing from 2 to 14 carbon atoms;
with said fluorinated polyurethane-ureas being furthermore characterized in that:
(i) the hard components (c) and (d) represent, together, from 10 to 60% of total components, by weight;
(ii) the molar ratio of the rubber-like component (a) to the rubber-like component (b) is comprised within the range of from 2 to 20;
(iii) the amount of rubber-like component (b) is such that the polymer contains from 4 to 30% by weight of fluorine;
(iv) at least 80% of perfluoropolyether or fluoropolyether segments deriving from (b) component are connected, at at least one of their sides, through a segment deriving from a diisocyanate component (c), with a rubber-like segment deriving from an (a) component.

4. Fluorinated polyurethane-ureas according to claim 3, characterized in that the value of "n" in the formula of (b) component is of 1 or 2.

5. A process for preparing a polyurethane of claim 1 comprising:
(a) reacting the diisocyanate with the polyether- or polyester- or polybutadiene-diol at temperatures within the range of from 70° C. to 110° C., with a molar ratio of diisocyanate to polyether- or polyester- or polybutadiene-diol within the range of from 2.0 to 2.5;
(b) reacting the end product from step (a) with the perfluoropolyether- or fluoropolyether-diol in the same temperature range, using a molar ratio of polyether- or polyester- or polybutadiene-diol of step (a) to perfluoropolyether- or fluoropolyether-diol within the range of from 2 to 20; and
(c) reacting the prepolymer obtained in step (b) with the $C_2-C_{14}$ diol with the amount of diol being such that at least 95% of the isocyanate groups reacted in step (a) react, the reaction being carried out at an initial temperature of from 20° C. to 60° C. and being increased up to the range of from 60° C. to 100° C.

6. The process according to claim 5, wherein in step (a) the molar ratio of diisocyanate to polyether- or polyester-or polybutadiene-diol is within the range of from 2.0 to 2.2.

7. A process for preparing a polyurethane of claim 1, comprising:
(1) reacting the perfluoropolyether or fluoropolyether-diol with the diisocyanate, in the presence of a solvent comprising a chlorofluoroalkane or a hydrochlorofluoroalkane, at a temperature within the range of from 50° C. to 100° C., using a molar ratio of diisocyanate to perfluoropolyether- or fluoropolyether-diol within the range of 2 to 2.5;
(2) reacting the reaction mixture from step (1) with the polyether- or polyester- or polybutadiene-diol in the same temperature range as in step (1), with the molar ratio of polyether- or polyester- or polybutadiene-diol to perfluoropolyether or fluoropolyether-diol being within the range of from 2 to 2.5;
(3) adding a further amount of diisocyanate at a temperature within the range of 50° C. to 100° C., with all solvent being gradually distilled off, then adding a further amount of polyether- or polyester- or polybutadiene-diol; and
(4) adding, at a temperature with the range of from 20° C. to 60° C., the $C_2-C_{14}$ diol in such an amount that at least 95% of the isocyanate groups reacted in steps (1) and (3) react.

8. A process for preparing a polyurethane-urea according to claim 3 comprising:

(a) reacting the diisocyanate with the polyether- or polyester- or polybutadiene-diol at temperatures within the range of from 70° C. to 110° C., with a molar ratio of diisocyanate to polyether- or polyester- or polybutadiene-diol within the range of from 2.0 to 2.5;

(b) reacting the end product from step (a) with the perfluoropolyether or fluoropolyether-diol in the same temperature range, using a molar ratio of the polyether- or polyester- or polybutadiene-diol of step (a) to the perfluoropolyether- or fluoropolyether-diol within the range of from 2 to 20;

(c) reacting the prepolymer obtained in step (b) with the $C_2$–$C_{14}$ diamine with the amount of diamine being such that at least 95% of the isocyanate groups reacted in step (a) react, the reaction being carried out at an initial temperature of from 20° C. to 60° C., and being increased up to the range of from 60° C. to 100° C.

9. The process according to claim 8, wherein in step (a), the molar ratio of diisocyanate to polyether- or polyester-or polybutadiene-diol is within the range of from 2.0 to 2.2.

10. A process for preparing a polyurethane-urea according to claim 3, comprising:

(1) reacting the perfluoropolyether or fluoropolyether-diol with the diisocyanate, in the presence of a solvent comprising a chlorofluoroalkane or a hydrochlorofluoroalkane, at a temperature within the range of from 50° C. to 100° C., using a molar ratio of diisocyanate to perfluoropolyether- or fluoropolyether-diol within the range of 2 to 2.5;

(2) reacting the reaction mixture from step (1) with the polyether- or polyester- or polybutadiene-diol in the same temperature range as in step (1), with the molar ratio of polyether- or polyester- or polybutadiene-diol to perfluoropolyether or fluoropolyether-diol being within the range of from 2 to 2.5;

(3) adding a further amount of diisocyanate at a temperature within the range of 50° C. to 100° C., with all solvent being gradually distilled off, then adding a further amount of polyether- or polyester- or polybutadiene-diol; and (4) adding, at a temperature with the range of from 20° C. to 60° C., the $C_2$–$C_{14}$ diamine in such an amount that at least 95% of the isocyanate groups of steps (1) and (3) will react.

11. Manufactured structures and articles which are to be exposed to very severe mechanical and chemical conditions, comprising the heat processable fluorinated polyurethane of claim 1.

12. The manufactured structure of claim 11, comprising a sealing system, a fitting or an elbow for use in mechanical or automotive devices.

13. Manufactured structures and articles which are to be exposed to very severe mechanical and chemical conditions, comprising the heat processable fluorinated polyurethane-urea of claim 3.

14. The manufactured structure of claim 13, comprising a sealing system, a fitting or an elbow for use in mechanical or automotive devices.

* * * * *

UNITED STATES PATENT AND TRADEMARK OFFICE
CERTIFICATE OF CORRECTION

PATENT NO. : 5,332,798

DATED : July 26, 1994

INVENTOR(S): Enrico Ferreri et al.

It is certified that error appears in the above-identified patent and that said Letters Patent is hereby corrected as shown below:

Column 15, line 41, claim 1(d)(ii) change "component (b)" to --component (a)--.

Signed and Sealed this

Twenty-seventh Day of September, 1994

Attest:

BRUCE LEHMAN

Attesting Officer

*Commissioner of Patents and Trademarks*